United States Patent

Ishida et al.

[11] Patent Number: 6,044,527
[45] Date of Patent: Apr. 4, 2000

[54] CORD END STOPPER

[75] Inventors: Tomohisa Ishida, Kawaguchi; Masao Nozawa, Tokyo, both of Japan

[73] Assignee: YKK Corporation, Tokyo, Japan

[21] Appl. No.: 08/990,514

[22] Filed: Dec. 15, 1997

[30] Foreign Application Priority Data

Dec. 16, 1996 [JP] Japan .................................. 8-353596

[51] Int. Cl.[7] .................................................. F16G 11/00
[52] U.S. Cl. .................... 24/129 R; 24/115 F; 24/543
[58] Field of Search ............................. 24/129 R, 115 R, 24/115 G, 115 K, 130, 115 F, 3.4, 712.3, 712.9

[56] References Cited

U.S. PATENT DOCUMENTS

| | | | |
|---|---|---|---|
| 4,416,038 | 11/1983 | Morrone, III | 24/543 |
| 4,715,094 | 12/1987 | Herdman | 24/712.3 |
| 4,909,298 | 3/1990 | Langhart et al. | |
| 5,022,127 | 6/1991 | Ang | 24/712.3 |
| 5,027,477 | 7/1991 | Seron | 24/3.4 |
| 5,136,756 | 8/1992 | Krauss | 24/129 R |
| 5,208,950 | 5/1993 | Merritt | |
| 5,473,797 | 12/1995 | Wu | |
| 5,533,238 | 7/1996 | Say | |
| 5,634,244 | 6/1997 | Fetsch et al. | 24/115 F |
| 5,671,508 | 9/1997 | Murai | 24/129 R |

FOREIGN PATENT DOCUMENTS

| | | |
|---|---|---|
| 0719 958 A2 | 7/1996 | European Pat. Off. |
| 51 038 407 | 8/1976 | Japan |
| 51-38407 | 9/1976 | Japan |

*Primary Examiner*—Victor N. Sakran
*Attorney, Agent, or Firm*—Hill & Simpson

[57] ABSTRACT

A cord end stopper comprising a male member having an engaging member and a female member having an engaging portion for interlocking engagement with the engaging member, the male member and the female member, when joined, defining therebetween a groove for accommodating a cord, the male members and the female member each having a plurality of cord locking means provided in its inner surfaces within the groove across the cord and disposed in staggered relation to the other's locking means, so as to provide, within the groove a zigzag or sinuous path for accommodating the cord therein.

11 Claims, 4 Drawing Sheets

CORD END STOPPER

BACKGROUND OF THE INVENTION

1. Field of the Invention

The present invention relates to a cord end stopper attached to the end of a cord inserted through a sleeve or a ring formed in clothing, baggage, etc.

2. Description of the Prior Art

Heretofore, a cord has been inserted through sleeves formed in ski wear or the similar clothes, in order to adjust the size of the waist portion or to close the neck edge of the hood portion of such clothes. A cord end stopper is attached to each end of the cord so as to make it easier to manipulate the ends of the cord when binding and unbinding the cords, and to prevent the cord end from coming off the sleeve of the clothing.

As such a cord end stopper, a truncated-conical cord end stopper is well known. The truncated-conical cord end stopper is hollow and has a through hole formed through the longitudinal axis thereof for inserting the cord longitudinally therethrough. In use, one end of the cord is inserted through the truncated-conical cord end stopper from its smaller-diametered end of the stopper. That cord end which has come out from the greater-diametered end of the stopper is knotted. Then, the cord is pulled along, until the thus formed knot comes into complete fitting engagement with the truncated-conical cord end stopper.

Another example of cord end stopper of the type as described is disclosed in Japanese Utility Model Publication No. 51-38407. According to this publication, the cord end stopper is comprised of two pieces, a male member and a female member. The male member and the female member are constructed so as to be coupled with each other to define a groove therebetween for accommodating a cord therein. A plurality of prongs are provided on the inner surfaces of the groove so as to project in such a direction as to face the cord. In use, the cord is inserted in the groove in the female member of the cord end stopper, and then, the male member is jointed to the female member, whereupon the prongs are brought into binding engagement with the cord accommodated in the groove so that the cord can be clamped and retained firmly between the male and female member.

In the former type of conventional cord end stoppers, in order to attach the cord end stopper to the end of the cord, the cord must be threaded through the truncated-conical cord end stopper, then knotted, and eventually, pulled along until the knotted end gets covered by the truncated-conical cord end stopper. Such operation of attaching the cord end stopper to the cord requires much time and cost, so that the operation efficiency is very low. Furthermore, when the truncated-conical cord end stopper is accidentally caught to a train door, a ski lift etc., a wearer would be dragged, thus being likely to incur injury.

The latter type conventional cord end stopper is easy in attaching a cord thereto. However, if a cord is very stiff like a hard rubber cord, then, the projecting prongs will not come into biting engagement with the cord, and thus will not hold the cord sufficiently. Besides, in the case that a soft fabric cord is used, the projecting prongs can bite the cord all right. However, yarns or filaments constituting the fabric cord are liable to be broken by the prongs so that the cord is easily raveled. In order to prevent or reduce this risk, the cord must be subjected to heat treatment, thus resulting in increase in number of steps for producing the cord.

SUMMARY OF THE INVENTION

With the foregoing problems in view, it is an object of the present invention to provide a cord end stopper that is easy to fasten a cord end thereto; that can retain the cord end firmly irrespective of what materials the cord is made of; and that can be easily released from the cord end if excessive stresses are exerted upon the cord.

According to one aspect of the present invention, a cord end stopper comprises a male member having an engaging member and a female member having an engaging portion for interlocking engagement with the engaging member for joining the male and female members. The male member and the female member have respective grooves, so that the male member and the female member, when joined, defines therebetween grooves for accommodating a cord. The male members and the female member each have a plurality of cord locking means provided in its inner surfaces within the respective groove across the cord and disposed in staggered relation to the other member's locking means, so as to provide, within the grooves a sinuous path for retaining the cord therein.

According to another aspect of the present invention, there is provided a cord end stopper comprises a male member having an engaging member and a female member having an engaging portion for interlocking engagement with the engaging member for joining the male and female member. The male member and the female member have respective grooves so that, when joined, the male member and the female member define therebetween grooves for accommodating a cord. The female member has a shallow groove formed therein, so as to pass close to the engaging portion, to allow the engaging member to break or resiliently deform and to thus come out of interlocking engagement with the engaging portion, when forces larger than a certain limit are exerted upon the cord.

Many other advantages and features of the present invention will become manifest to those versed in the art upon making reference to the detailed description and the accompanying sheets of drawings in which preferred structural embodiments incorporating the principles of the present invention are shown by way of illustrative example.

DESCRIPTION OF THE PREFERRED EMBODIMENT

A preferred embodiment of the present invention will be described below in conjunction with the drawings appended hereto.

Figure 1:
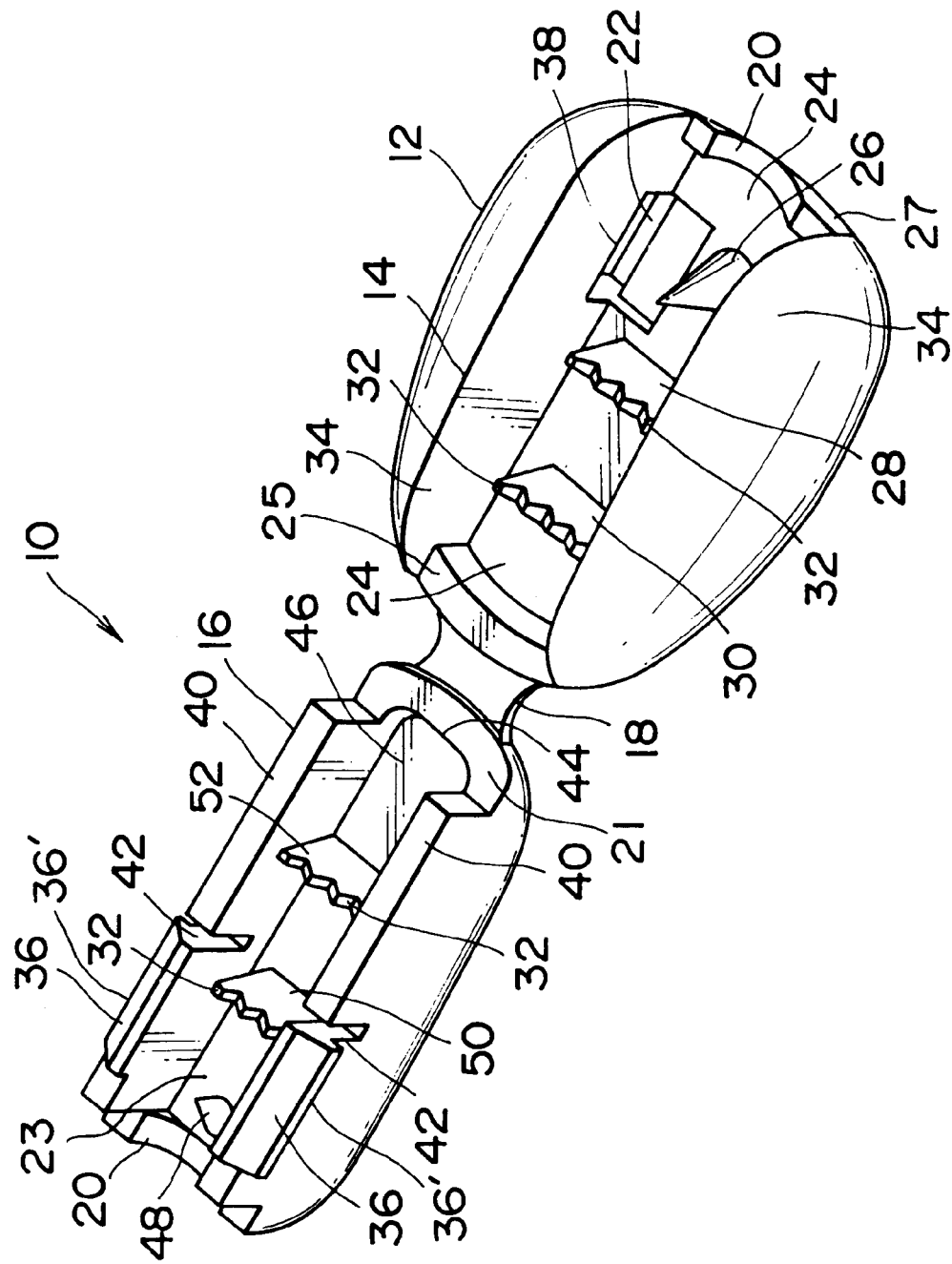
FIG. 1 is a perspective view of a cord end stopper according to the present invention, showing it in an open disposition.

FIGS. 1 through 5 show one preferred embodiment of the present invention. A cord end stopper 10 according to the present invention is made of plastics, and is comprised of a female member 12 and a male member 16 integrally formed with the female member 12 via a hinged portion 18. The female member 12 is substantially egg-shaped but, is slightly flat, perpendicularly, to the plane in which the male member 16 and the female member 12 is joined via the hinged portion 18, as shown in FIG. 1. The female member 12 includes a base wall 24 and a pair of opposed side walls 34, 34, one provided on each of the opposed lateral edges of the base wall 24 so as to define a groove 14 with the base wall 24.

The groove 14 is closed at its opposed ends by a pair of opposed terminal end walls 25, 27 which are half as high as the depth of the groove 14. The distal end wall 27 of the female member 12, that is, the end wall 27 that is remote from the hinge portion 18 is formed with a semicircular notch 20. As cord locking means, a prong 26, and a pair of first and second blades 28, 30 are protuberantly provided on the inner surface of the bottom wall 24, and disposed in the order named above from the side of the semicircular notch 20. These locking means are all used for locking the end of the cord 58 in corporation with cord locking means of the male member 16, as closely described hereinbelow. The prong 26 is of conical shape with a sharp top. Each of the blades 28, 30 is disposed substantially normal to the longitudinal axis of the groove 14, and has a serrated edge 32 formed along its upper end.

A pair of opposed engaging portions 38, 38 are formed partly in the respective corners at which the bottom wall 24 and the respective side walls 34, 34 are joined. The engaging portions 38, 38 are designed for locking engagement with a pair of engaging members 36, 36 of the male member 16, as clearly described hereinafter. As better shown in FIGS. 1 and 4 (B), each engaging portion 38 is constituted by a corner recess 38 blending in the inner surfaces of the bottom wall 24 and the respective side wall 34. The corner recess 38 has a through aperture 22 formed through the female member 12.

Figure 5:
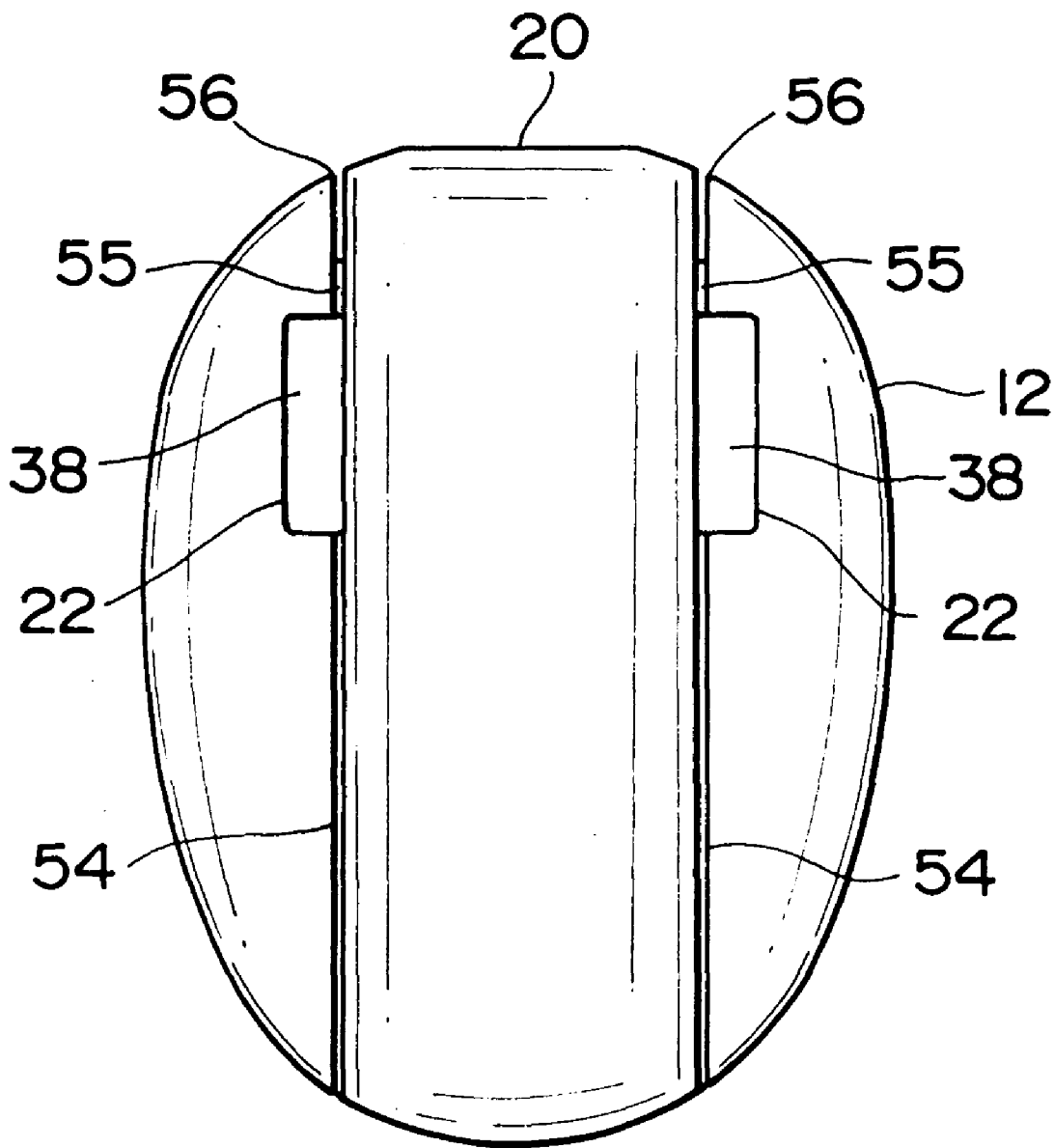
FIG. 5 is a front view of the female member of the cord end stopper.

As shown in FIG. 5, a pair of opposed shallow grooves 54, 54 are formed in the outer surface of the female member 12 and disposed along the inner surfaces of the opposed side walls 34, 34 of the female member 12. Each shallow groove 54 blends into the inner edge of the corresponding through aperture 22 which corresponds to the corner recess 38. Another pair of opposed shallow grooves 55, 55 are formed in the outer surface of the female member 12 on the other side of the through aperture 22 or on the side closer to the semicircular notch 20, and disposed in alignment with the respective shallow grooves 54, 54. Consequently, the shallow grooves 54, 55 run close to the engaging portion 38. The shallow grooves 55, 55 blend into respective through slits 56, 56 formed through the female member 12, in vicinity of the aperture 22.

As shown in FIG. 1, the female member 12 has the thinned hinge portion 18 provided at the end that is opposite to the semicircular notch 20.

The male member 16 is joined with the female member 12 at their proximal ends by the thinned hinge portion 18 and is adapted to fit into the groove 14 of the female member 12, when the male member 16 and the female member 12 are folded back around the hinge portion 18. The male member 16 has a pair of guide walls 40, 40, one provided on each of the opposed sides thereof and adapted to come into confronting relation with the side walls 34, 34 of the female member 12, when the male member 16 fits into the groove 14 of the female member 12. A pair of opposed engaging members 36, 36 are provided intermediately on the guide walls 40, 40, respectively. The engaging members 36, 36 are raised beyond the upper edges of the respective guide walls 40, 40, and have their hooked heads 36', 36' directed remote from each other. A cut 42 is formed in each guide wall 40 along one side of the engaging member 36 in order to facilitate resilient deflection of the engaging member 36. In the cord end stopper 10 illustrated in this embodiment, the engaging member 36 and the guide wall 40 are identical in thickness, however, the engaging member 36 may be made thinner than the guide wall 40 to further facilitate disengaging operation of the male member 16 from the female member 12.

A bottom wall 46 is interposed between the opposed guide walls 40, 40. The bottom wall 46 and the opposed guide walls 40, 40 define therebween a groove 44. The groove 44 is closed at its opposed ends by a pair of opposed terminal end walls which are half as high as the depth of the male groove 44. The distal end wall 23 of the male member 16, that is, the end wall 23 that is remote from the hinge portion 18 is formed with a semicircular notch 20. The semicircular notches 20, 20 of the male member 16 and female member 12 are joined to define therebetween a cord passing aperture for letting the cord to pass therethrough, when the male member 16 and the female member 12 are folded back on the hinge portion 18 into confronting relation to each other. As cord locking means, a prong 48 and a pair of first and second blades 50, 52 are protuberantly provided on the inner surface of the bottom wall 46 and arranged in the order named above from the notch 20. The prong 48 and the first and second blades 50, 52 are adapted for holding the cord 58 in corporation with the prong 26 and the first and second blades 28, 30 of the female member 12. The prong 48 is of conical shape with a sharp top and each of the blades 50, 52 is disposed substantially normal to the longitudinal axis of the groove 44. Each blade 50, 52 has a serrated edge 32 formed at its upper end.

Figure 3:
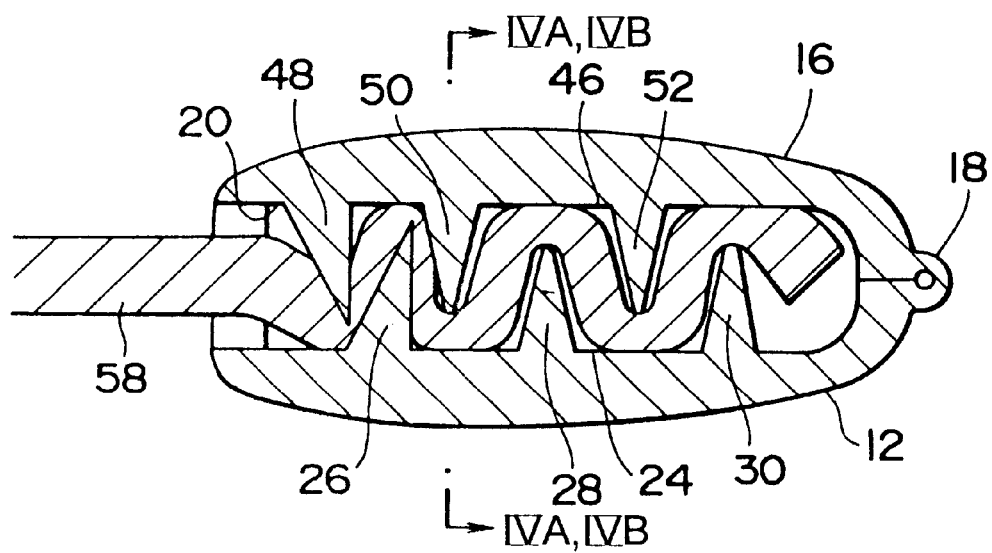
FIG. 3 is an enlarged cross-sectional view of the cord end stopper having the cord end attached thereto.
Figure 4A:
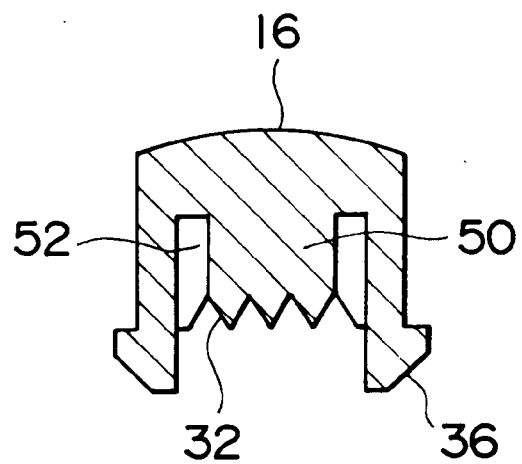
FIGS. 4A and 4B are cross-sectional views taken on line IVA, IVB-IVA, IVB of FIG. 3, but showing a male member and a female member of the cord end stopper separated and the cord omitted, for clarity's sake.
Figure 4B:
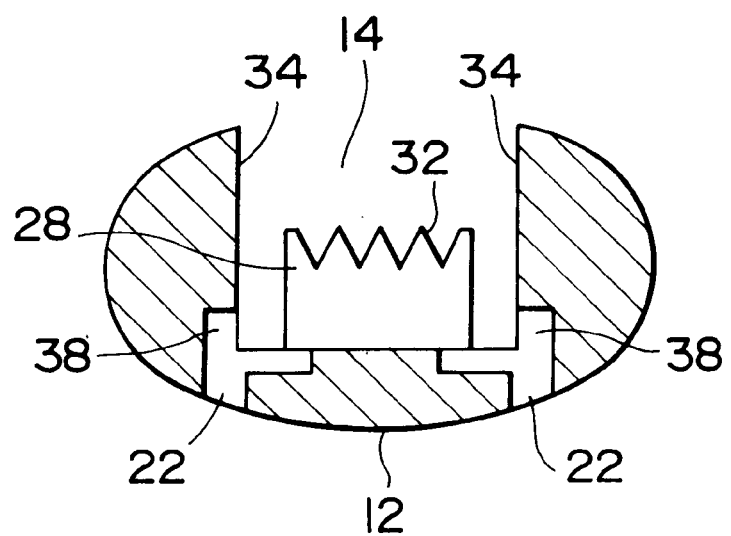

As better shown in FIG. 3, when the male member 16 and the female member 18 are folded back on the hinge portion 18 into confronting relation to each other, the female prong 26, and the female first and second blades 28, 30 of the female member 12 come into staggered relation to the male prong 48, and the male first and second blades 50, 52, respectively, of the male member 16. The lengths of the prongs 26, 48, and the first and second blades 28, 30, 50, 52 are such that, when the male member 16 and the female member 12 are folded back on the hinge portion 18 into confronting relation each other, the length over which the prong 26, the first and second blades 28, 30 of the female member 12 are overlapped with the prong 48, the first and second blades 50, 52, respectively, of the male member 16, perpendicularly to the general plane of the cord end stopper 10 are slightly greater than the diameter of the cord 58. This will advantageously increase the retentive force exerted by the cord end stopper 10 upon the cord 58. Furthermore, the teeth and the notches of the serrated edge 32 of the blades 50, 52 of the male member 16 are in registry with the teeth and the notches, respectively, of the serrated edge 32 of the blades 28, 30 of the female member 12. The first and second blades 8, 30, 50, 52 of the female and male member 12, 16 project beyond a plane passing at the hinge portion 18 and passing at the longitudinal axis of groove 14, 44, so that the path of the cord 58 extends alternately on one and the other side of a longitudinal axis of the groove 14, 44 in sinuous manner.

Now, description is made of the use of the cord end stopper 10 according to the present invention. First, the cord end stopper 10 according to the present invention is placed in open disposition as shown in FIG. 1. Then, the cord 58 is nested into the groove 44 of the male member 16 with one end of the cord 58 disposed in vicinity of the proximal end wall 21 thereof and with the cord 58 extended out of the semicircular notch 20. Then, the cord stopper 10 is folded back around the hinge portion 18 thanks to its resiliency so as to bring the male member 16 into fitting engagement with the groove 14 of the female member 12. As the male member 12 comes into fitting engagement with the groove 14 of the female member 12, the hooked heads 36', 36' of the engaging members 36, 36 of the male member 16 are deformed inward by the inner surfaces of the side walls 34, 34 against their resiliency until the hook heads 36' of the engaging members 36 reach the corner recesses 38, whereupon the hook heads 36' of the engaging members 36, 36 come into snapping engagement with the corner recesses 38, 38, so that the male and female members 16, 12 are firmly joined with each other.

When the male and female members 16, 12 are joined with each other, the prong 26, and the first and second blades 28, 30 of the female member 12 are disposed in staggered relation to the prong 48, and the first and third blades 50, 52, respectively, of the male member 16, so that the inner surface of the bottom wall 24, the prong 26 and the first and second blades 28, 30 of the female member 12, and the corresponding parts 46, 48, 50, 52 of the male member 16 will jointly form sinuous or wavy path wherein the cord 58 are frictionally retained between the prongs 26, 48, the first and second blades 28, 30 , 50, 52, and the inner surface of the bottom wall 24, 46 of the female and male members 12, 16. Furthermore, the serrated edges 32 of the first and second blades 28, 30, 50, 52 and prongs 26, 48 of the female and male members 12, 16 are brought into biting engagement with the cord 58, so that the cord 58 can be fastened firmly to the cord end stopper 10.

When the cord end stopper 10 or cord 58 is caught by something extraneous and then is subjected to severe stresses tending to pull the cord 58 off the cord end stopper 10, the female member 12 and particularly, its engaging portions 38 are likely to break or resiliently deform along the shallow grooves 54, 55 which pass close to the engaging portion 38, thus making the latter fragile or deformable, so that the male member 16 and the female member 12 are easily uncoupled to thus release the cord 58 therefrom.

As mentioned hereinbefore, the cord 58 is frictionally retained in sinuous path by the prongs 26, 48, the first and second blades 28, 30, 50, 52, and the inner surface of the bottom walls 46, 24 of the male and female members 12, 16. Furthermore, the serrated edges 32 of the first and second blades 28, 30, 50, 52 and prongs 26, 48 of the female and male members 12,16 are brought into biting engagement with the cord 58. Consequently, the cord stop end stopper 10 can retain various kinds of cords 58, such as a cord of non-uniform thickness, a hard rubber cord.

If the cord end stopper 10 is caught by something extraneous, to thus being subjected to abnormal tension, the cord end stopper 10 easily comes off the cord 58, so that the cord 58 is released from the wearer. This completely prevents the cord 58 from squeezing his throat or other body parts.

Furthermore, a mere folding of the cord end stopper 10 back around the hinged portion 18 brings engaging member 36 of the male member 16 into locking engagement with the engaging portion 38 of the female member 12, thus leading to coupling of the male and female members 12, 16, so that the operation of fastening the cord end stopper 10 to the cord 58 can be carried out by only one hand without using any jig or like guiding tool, resulting in saving in cost, labor and time. Moreover, the male and female member 12, 16 are integrally joined by the hinge portion 18, to thus make a one-piece cord end stopper 10, so that the necessity of keeping male member parts and female member parts in stock separately has been advantageously eliminated.

Figure 2:
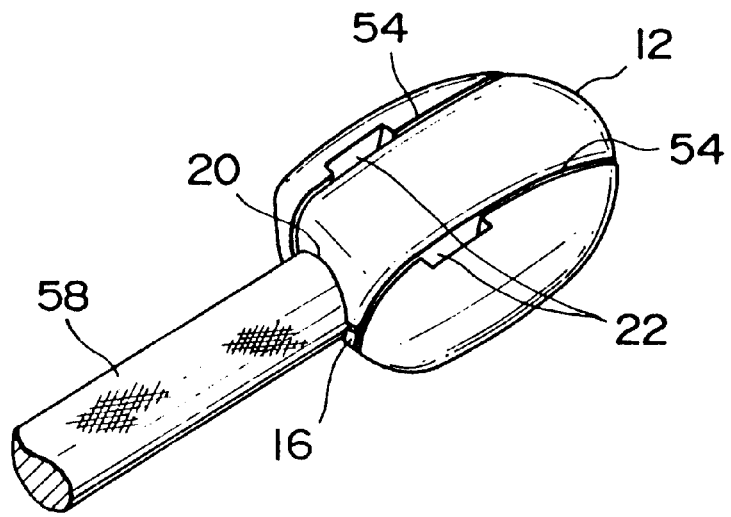
FIG. 2 is a perspective view of the cord end stopper of FIG. 1, but showing he cord end stopper closed for attachment of a cord end thereto.

Still furthermore, since the cord end stopper 10 is structured such that the male member 12 having the cord 58 nested therein is in turn completely housed within the groove 14 of the female member 12, the cord end stopper 10 as a whole presents a flat and smooth surface like a flat egg, as better shown in FIG. 2, thus imparting soft touch to the wearer and being very attractive in appearance.

Yet furthermore, the male member 16 has a pair of guide walls 40, 40 disposed in confronting relation to the opposed side walls 34, 34 of the female member 12. This facilitates the operation of inserting the end of a cord 58 into the groove 44 defined by the opposed guide walls 40, 40 of the male member 16; and the operation of fitting the male member 16 into the groove 14 of the female member 12, so that the cord 58 is beautifully attached to the cord end stopper 10 with the cord completely covered thereby, hence without part of the cord exposed out of the stopper 10. Consequently, the efficiency of operation of attaching the cord to the cord end stopper 10 is enhanced greatly.

The cord end stopper 10 according to the present invention is easy to attach a cord end thereto, and efficient in production. Furthermore, it can be used for various types of cords, such as a hard cord, a rubber cord, a cord with irregular diameter. Furthermore, if a severe stress in excess of a certain value is exerted upon the cord end stopper 10, it will partly break or resiliently deform so as to uncouple the male member and the female member, so that the cord readily comes off the cord end stopper 10, without any risk of choking or otherwise injuring the wearer.

The present invention is not limited to the embodiment described above in detail, and so, many modifications and variations can be made to the invention as conceived, without departing from the inventive idea characterizing it. For example, the cord end stopper 10 may assume any suitable appearance; projecting prongs and blades may be provided in any suitable number and may assume any suitable shapes and positions; engaging members and engaging portions may assume any shapes that ensure positive engagement therebetween. The male member and the female member need not be connected by a hinge portion, so that they may be separate from each other.

Obviously, the skilled person would realize that various modifications and variations of the present invention are possible in the light of the above teaching. It is therefore to be understood that within the scope of the appended claims the invention may be practiced otherwise than as specifically described, and that the invention is not limited to the embodiments described above in detail.

What is claimed is:

1. A cord end stopper comprising a male member having an engaging member and a female member having an engaging portion for interlocking engagement with the engaging member for joining the male and female members, the male member and the female member having respective grooves, so that, when joined, the male member and the female member define therebetween grooves for accommodating a cord, the male member and the female member each having a plurality of cord locking means provided in its inner surfaces within the respective groove across the cord and disposed in staggered relation to the other member's locking means, so as to provide, within the grooves a sinuous path for retaining the cord therein, the male and female cord locking means overlapping each other by a distance slightly greater than a diameter of the cord.

2. A cord end stopper according to claim 1, further including a hinge portion joining the male member and the female member at their respective one ends; the male member and the female member each having a notch formed at its respective other end, so that, when the male member and the female member are folded back on the hinge portion into confronting relation to each other, the notches are joined so as to provide a cord inserting aperture.

3. A cord end stopper according to claim 2, the cord locking means project beyond a plane passing at the hinge portion and passing at the longitudinal axis of groove, so that the path of the cord extends alternately on one and the other side of a longitudinal axis of the groove in sinuous manner.

4. A cord end stopper according to claim 1, each of the cord locking means having serrated edges formed at its distal ends.

5. A cord end stopper according to claim 1, when the male and female members are joined with each other, the male member having the cord nested in its groove being, in turn, housed within the groove of the female member.

6. A cord end stopper according to claim 5, the female member having a pair of opposed side walls, one provided on each of the opposed lateral edges thereof, which define the groove of the female member therebetween, the male member having a pair of opposed guide walls one provided on each of opposed sides thereof, which define therebetween the groove of the male member and which are adapted to come into confronting relation to the opposed side walls of the female member.

7. A cord end stopper according to claim 1, wherein said cord locking means of said male and female members comprises a pointed prong and a serrated blade.

8. A cord end stopper comprising a male member having an engaging member and a female member having an engaging portion for interlocking engagement with the engaging member for joining the male and female member, the male member and the female member having respective grooves, so that, when joined, the male member and the female member define therebetween grooves for accommodating a cord, the female member having a shallow groove formed in an outer surface of the female member, so as to pass close to the engaging portion, to allow the engaging member to break or resiliently deform and to thus come out of interlocking engagement with the engaging portion, when forces larger than a certain limit are exerted upon the cord.

9. A cord end stopper according to claim 8, the engaging portion being disposed adjacent to one end of the female member and constituted by a recess.

10. A cord end stopper according to claim 9, the recess having a through aperture formed through the female member; the female member having a through slit formed therethrough in vicinity of the end of the female member, the shallow groove blending into the through slit.

11. A cord end stopper according to claim 8, wherein the female member has a pair of shallow grooves in the outer surface of the female member and on opposite sides of the engaging portion of the female member.

\* \* \* \* \*